3,505,637
DIGITAL OVERFLOW THRESHOLD FOR SONAR
Joseph Abruzzo, Severna Park, Md., assignor, by mesne assignments, to the United States of America as represented by the Secretary of the Navy
Filed Mar. 10, 1964, Ser. No. 350,923
Int. Cl. G01s 9/66
U.S. Cl. 340—3       2 Claims This invention relates to sonar systems and is particularly directed to means for processing and displaying signals received by underwater transducers.

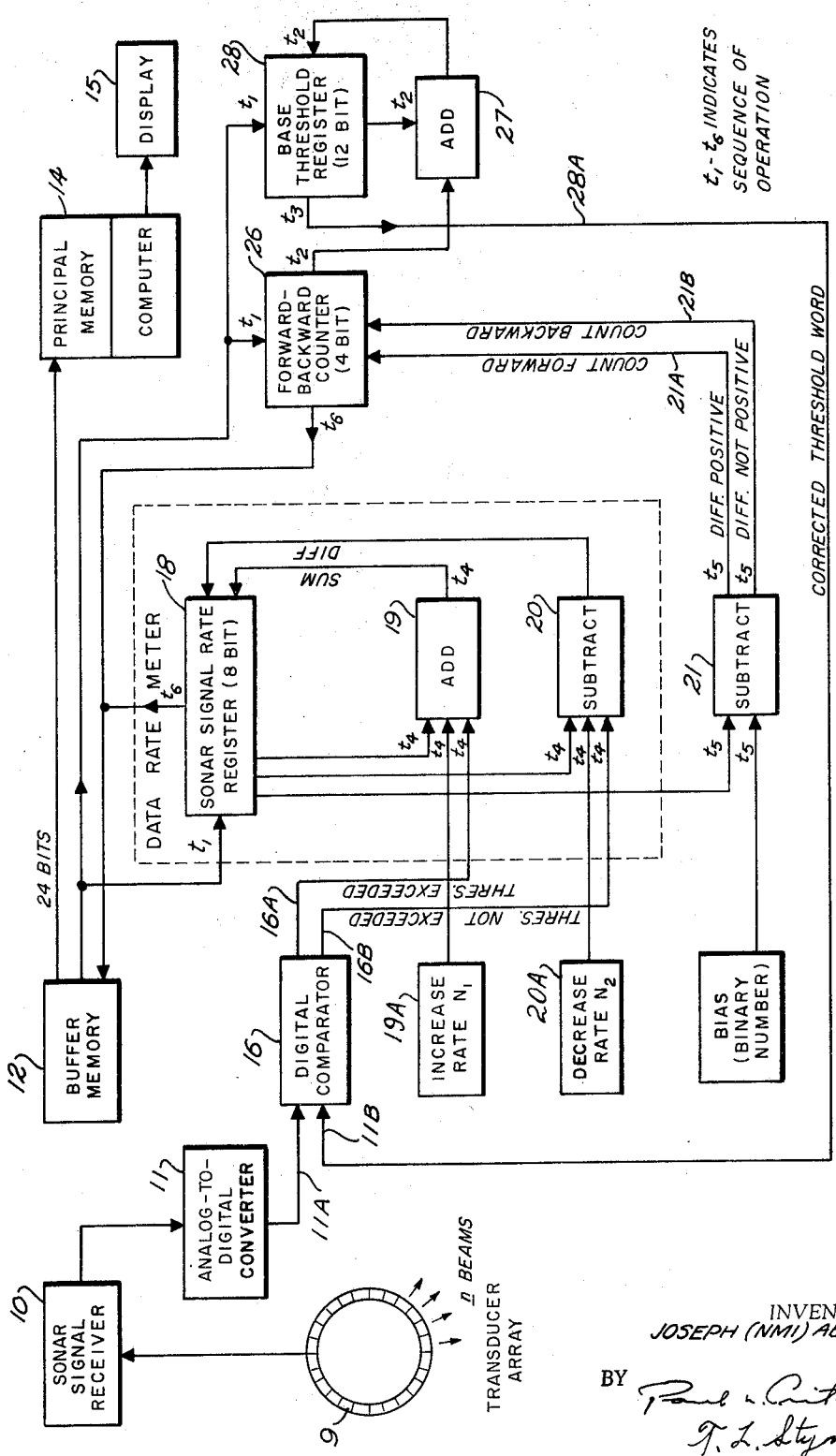

The sonar system contemplated here comprises a transducer array from which is transmitted omnidirectionally a powerful pulse or "ping." When the echo signals are received the signals of the various transducer elements are combined in the proper phase relation to produce high gain narrow beam patterns. By sampling the signals of each beam in succession the direction, amplitude, and other information relevant to each signal can be obtained. Systems of this type are described in the co-pending application, Ser. No. 323,549, filed Nov. 12, 1963.

One of the functions of the sonar signal processor used in such a system is to determine whether a sonar return has exceeded an amplitude threshold. If the threshold has been exceeded the amplitude, coded in binary, is sent to storage in a computer. In order that a computer memory be not overloaded with a large amount of irrelevant information, it has become necessary to employ a technique known as "overflow thresholding." This technique effects an automatic dynamic variation of amplitude threshold as a function of rate of sonar returns. The returns from a large land mass, for example, must not establish a high threshold so as to exclude returns from a small target, else the purpose of the system would be lost. Accordingly, it is desirable to apply overflow thresholding on a per beam basis. This requires that a constant history of sonar returns be maintained for each beam. It is desirable, also, that the threshold number for each beam increase and decrease at rates controllable by the operator.

The problem of overflow thresholding has been met in prior sonar systems by an approach which involves the use of both analog and digital signals. Such a method has undesriable features including lack of flexibility with respect to integrating rates and threshold scaling. For application to analog-digital systems it would be quite costly to implement and maintain because of the large number of components since a separate sub-system would be required for each of the large number of beams.

A principal object of this invention is to provide improved means for reducing the number of unwanted signals which may reach the display screen of a sonar system.

Another object of this invention is to provide threshold circuits which will respond effectively to all signal rates.

A still more specific object of this invention is to provide a thresholding system which is flexible with respect to integrating rates and threshold scaling and which is inexpensive to implement.

Other objects will appear to those skilled in the art by referring to the specific embodiment described in the following specification and shown in the accompanying drawing in which the single figure of the drawing shows the principal sub-assemblies and the flow of information through the circuits.

Improvement is brought about in the sonar system of this invention by performing digital additions for the purpose of up-dating the threshold number. An entirely digitalized approach is disclosed here. This method makes use of a portion of the buffer memory 12 which ultimately feeds the received sonar events to the principal memory and computer 14, and hence to the display 15.

Raw sonar signals are received from the transducer array 9 which are detected and amplified in receiver 10. It is contemplated that signals from one beam are received and processed before signals from the next adjacent beam are treated. After detection the signals are converted, in the analog-to-digital converter 11, to a binary word of a sufficient number of bits to completely define the signal.

It is contemplated that the transducer array 9 may comprise a plurality of individual transducer elements cylindrically arranged, as shown. The transducer elements are energized by a powerful pulse to ensonify the water environment omnidirectionally or in a wide angle segment. Seconds or fractions of seconds later echo signals are received on each of the transducer elements and the received signals are combined in the proper phase relationships to give substantial gain to any and all received signal within a relatively narrow beam. The beams are sampled in rapid succession for signals, which are processed in the circuitry shown.

The transducer may be carried on a moving ship and, the direction of a target with respect to the transducer can be expected to continually change. The digital overflow thresholding technique requires that a buffer memory, shown at 12, be provided for temporary digital storage of each beam. Each memory address can easily be provided with ample capacity storage of rotating directional (RDT) corrections in addition to the desired sonar data words which are to be forwarded to the general purpose computer of the system. The principal memory and computer are shown at 14. Buffer memory 12 is ordinarily organized in words of 30 bit lengths since this is the length normally adopted for communication in the sonar systems of this type. The 30 bit length is far in excess of the number of rotating directional transmission correction bits required during normal maneuvering of the carrying ship. For the purpose of describing the overflow threshold scheme let it be assumed that 12 bits are available for overflow thresholding. Of the remaining 18 bits let it be assumed 6 bits are set aside for the RDT correction and 12 bits for storage of a base or minimum threshold number. Where the transducer array 9 is capable of 48 beams, as in one successful system, the buffer storage 12 must have 48 rapid-access addresses into which may be read in and out continually information on an assigned beam. If, of course, a unique base threshold is not required for each beam but instead a single base threshold common to all beams is satisfactory, the buffer storage 12 for these 12 bits can consist of a single flip-flop register acceptale to all the beams in turn.

At the beginning of each beam processing cycle the contents of the buffer memory at one address is read out to the sonar system rate register 18 as well as to the forward-backward counter 26 and to the base threshold register 28. If the base threshold comprises 12 bits as suggested, the forward-backward counter read-in may comprise 4 bits and the sonar signal rate register may comprise 8 bits. The registers and the counter may be comprised of conventional cascaded flip-flops known in the art. The registers 18 and 28 may comprise flip-flop banks which are capable of being set in parallel and can perform right shifting. The forward-backward counter 26 is preferably a parallel counter which upon being pulsed in the forward direction will advance through the 16 states in the downward direction:

```
0–0000
1–0001
2–0010
14–1110
15–1111
```

When pulsed in the backward direction the counter advances through the 16 states shown in the sequence indicated by the upward direction.

The clock rate for controlling the registers and counter will be at some multiple of the beam sampling rate. It has been found convenient to employ a cycle of six time intervals, T1 to T6, for operating the circuits of the drawing during each beam processing period. It will be assumed in the description here that all of the beams of the transducer have been sampled and processed one or more times and that the buffer storage 12 contains historical information concerning targets in each beam.

The sequence of events in the operation of the circuits of the drawing starting with time T1 of the cycle will be assumed.

At time T1 of the cycle on a per beam basis, the threshold bits are read out of buffer storage. The 12 bits of the base threshold are placed in the 12-bit base threshold register 28. The numerical value of the 12-bit word is determined on a per ping or per pulse basis after one or more complete cyclings of the 48 beams. Also at time T1, an 8-bit word is fed to register 18. The 8 bits were stored from the register 18 at the end (T6) of the previous period. Finally in time T1, 4 bits are moved from storage to counter 26, the 4 bits having been placed in storage during T6 of the previous beam sampling. The counter 26 is of the forward-backward type.

At time T2 the 4 bits of the forward-backward counter 26 are added through a binary adder 27 to the contents of the 12-bit base threshold register 28 and are stored in the 12-bit register in place of the original 12 bits.

At time T3, the sum of the base threshold value and the overflow threshold value is sent from the register 28 to the digital comparator 16 through line 28A. The amplitude of each presently received sonar signal appearing at terminal 11A of the comparator 16 will either exceed or not exceed the magnitude of the threshold number applied at terminal 11B. If the threshold is exceeded a signal will appear on output line 16A of the comparator, while if the threshold is not exceeded, a signal will appear on output line 16B.

At time T4 the number in the 8-bit register 18 is increased by an amount $N_1$ each time the threshold is exceeded. The number in the 8-bit register is decreased by an amount $N_2$ each time the threshold is not exceeded. The weights $N_1$ and $N_2$ may be selected by an operator, and these weights may, conveniently, be manually set into switches 19A and 20A. Switch 19A may comprise, for example, a conventional shaft rotation-to-digital converter which will produce binary coded decimal numbers as a shaft is moved to different positions. The "1" and "0" voltage of such a converter may be transferred, by serial or parallel readout, to adder 19 where the binary coded decimal number will stand. Now, the number standing in the adder can be added to the quantity standing in register 18 each time a threshold-exceeded signal, such as a single positive pulse, is received over line 16A. That is, the contents of register 18 will increase an increment equal to N1 and the rate at which these increments are added to register 18 is a function of the rate at which the threshold-exceeded signals are received. Likewise, the contents of register 18 will be decreased by the subtraction of increments equal to N2 at the rate threshold-not-exceeded signals are received.

At time T5, if the value in the 8-bit register 18 exceeds an operator-selected bias, the 4-bit counter 26 is advanced one count. If, however, the value standing in the 8-bit register does not exceed the operator's selected bias the counter 26 is decreased one count. The comparison here is made in the subtractor 21, which will yield a position voltage on either of the two lines 21A or 21B.

At time T6 the new threshold correction word in the 8-bit register 18 and in the 4-bit counter 26 is filed in the buffer memory at the address at which the information at time T1 were obtained. The content of the 12-bit register is cleared in preparation for the next entry.

It can be summarized from the above that the rate at which sonar signals are received determines the rate of pulses on output line 16A and 16B which in turn determines the rate of additions of numbers $N_1$ to or subtractions of number $N_2$ from the sonar signal rate register 18 which, in turn, through subtractor 21 adds to or subtracts 1's from the forward-backward counter 26. Counter 21, in turn, revises the contents of the base threshold register 28, through adder 27. As stated, register 28 contains the corrected base threshold number and applies that number over line 28A to terminal 11B of the digital comparator 16. Hence, the rate of change of the base number becomes responsive to the rate sonar signals are received.

Thus it is seen that complete flexibility of control of the thresholding processes is under the control of the operator. The operator can control the rate of increase, $N_1$, of the threshold number or the rate of decrease, $N_2$, of the number. Yet complete flexibility is achieved in a system with a single memory storage and a single set of registers and counters. Many modifications may be made in the specific embodiment described without departing from the scope of the invention. The comparator 16, for example, may be analog if desired.

What is claimed is:

1. In combination in a sonar system for successively sampling sonar beam signals received at a transducer array from a plurality of directions in response to each transmitted pulse, and for storing each signal, which exceeds a threshold quantity, at a different address in buffer storage, said combination comprising:

a comparator;
a signal rate meter including a shift register;
a forward-backward counter;
a base threshold register;
two input circuits of said comparator being connected; respectively, to the output circuits of the sonar receiver and said base threshold register; and two output circuits of said comparator, containing signals, respectively, when the amplitude of sonar signals exceed and do not exceed the magnitude of the base threshold quantity;
means responsive to said two comparator output signals for, respectively, increasing and decreasing the number in the shift register of said rate meter;
means responsive to said shift register for, respectively, adding to or subtracting from the contents of said forward-backward, and
means for adding the contents of said forward-backward counter to the contents of said base threshold register.

2. In combination in a thresholding system:

a base register;
a comparator for comparing numbers representative of the amplitude of random signals with a variable threshold number in said base register;
means for varying said threshold number upwardly and downwardly, respectively, said means including a forward-backward counter, and a sonar signal rate register;
means for increasing the contents of said rate register a predetermined amount, $N_1$, in response to each signal from said comparator which is above said variable threshold number;
means for decreasing the contents of said rate register a predetermined amount, $N_2$, in response to each signal from said comparator which is below said variable threshold number;

means for comparing the contents of said rate register with a bias number;

sand forward-backward counter being responsive to the bias comparing means for, respectively, adding to or subtracting from the threshold number of said base register.

References Cited
UNITED STATES PATENTS

| | | | |
|---|---|---|---|
| 3,181,157 | 4/1965 | Martin et al. | 343—17.1 |
| 3,214,754 | 10/1965 | Hilderbrandt | 343—5 |

RICHARD A. FARLEY, Primary Examiner

U.S. Cl. X.R.

343—7, 17.1